3,629,299
1α,3-DI LOWER ALKOXY - 21 - CARLIO-LOWER ALKOXY-PREGNA - 3,5 - DIENE AND PROCESS FOR THE PRODUCTION THEREOF
Joel E. Huber, Kalamazoo, Mich., assignor to The Upjohn Company, Kalamazoo, Mich.
No Drawing. Filed Mar. 5, 1969, Ser. No. 804,702
Int. Cl. C07c 169/52
U.S. Cl. 260—397.1          6 Claims

ABSTRACT OF THE DISCLOSURE

This invention relates to the synthesis of steriodal 1α-alkoxy-$\Delta^{3,5}$-3-ol ethers and the synthesis of steroidal $\Delta^{1,3,5}$ trienol-3-alkyl ethers by reaction of $\Delta^{1,4}$-3-ketosteroids with trialkylorthoformate esters in the presence of an alkanol and an acid catalyst.

SUMMARY OF THE INVENTION

According to the invention, 3-keto-$\Delta^{1,4}$-pregnadienes such as the 3-keto-$\Delta^{1,4}$-17(20)-pregnatrien-21-oic acid ester disclosed in U.S. Pat. 2,774,775 can be converted to the corresponding 3-enol alkyl ethers or to the 1α-alkoxy-$\Delta^{3,5}$-pregnadienol-3-alkyl ethers by reaction with trilower-alkylorthoformate in the presence of an alkanol and an acid catalyst. The foregoing reaction products are valuable intermediates in the preparation of such steroid compounds as 3-keto-$\Delta^{1,4}$-17(20)-pregnatrien - 21 - hydroxy compounds by reaction with a reducing agent. The latter reduced products are themselves valuable intermediates in the synthesis of steroid end products as disclosed in U.S. Pats. 2,774,775 and 2,862,010. The invention process is thus one of producing steroids with a partial structure of

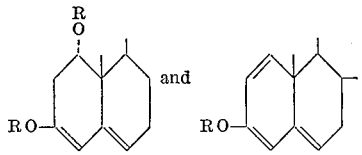

wherein R is a lower alkyl group of from 1 to 8 carbon atoms comprising treating a steroid with the partial structure of

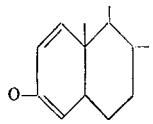

with $(RO)_3CH$ in the presence of ROH and an acid catalyst.

Among the 3-keto-$\Delta^{1,4}$-dienes that can be used as starting materials as set forth in accordance with this invention are those disclosed in U.S. Pat. 2,774,775 containing a 21-oic acid ester group. These starting materials can possess a variety of substituents attached to the nuclear rings which are non-interfering in the enol ether formation, and which are stable in the acid environment of the reaction, for example: hydroxyl, acyloxy, methyl or other lower alkyl, methylene or other lower alkylene, fluoro or other halogen, or keto. The nucleus can contain more than one such substituent, situated at positions in the molecule conventionally encountered in steroid products possessing pharmacological activity, such as positions 7, 9, 11, 12, 15, 16 and 17. The starting material can also contain additional non-interfering double bonds such as the 17(20) double bond, and the terms "pregnadiene" and "pregnadienol" as used herein includes compounds having such additional non-interfering double bonds.

DETAILED DESCRIPTION OF THE INVENTION

A typical starting compound is one having the following structure:

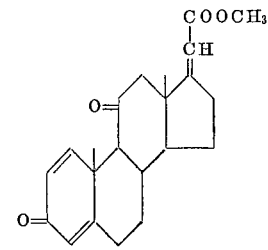

I

Typical reaction products have the following structures:

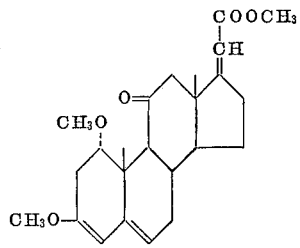

II and

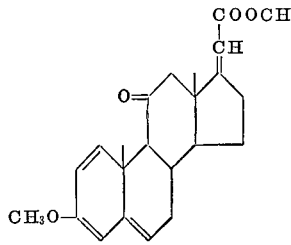

III

Reaction products II and III both occur as a consequence of the process of this invention. The former occurring in major proportion and the latter occurring in minor proportion.

The starting material, I, can have other substituents besides or instead of the 11-keto group. Thus, the starting material can be 3,11-diketo-16α-methyl-1,4,17(20)-pregnatrien-21-oic acid methyl ester,
3,11-diketo-16α-fluoro-1,4,17(20)-pregnatrien-21-oic acid methyl ester,
3,11-diketo-6α-methyl-1,4,17(20)-pregnatrien-21-oic acid methyl ester,
3,11-diketo-6α-fluoro-1,4,17(20)-pregnatrien-21-oic acid methyl ester,
3,11-diketo-7α-methyl-1,4,17(20)-pregnatrien-21-oic acid methyl ester,
3,11-diketo-16β-methyl-1,4,17(20)-pregnatrien-21-oic acid methyl ester,
3,11-diketo-16-methylene-1,4,17(20)-pregnatrien-21-oic acid methyl ester,
3-keto-16α-methyl-1,4,17(20)-pregnatrien-21-oic acid methyl ester, and
3-keto-6α-methyl-1,4,17(20)-pregnatrien-21-oic acid methyl ester.

Other suitable starting materials include:

11β,17α,21-trihydroxy-3,20-diketo-16α-methyl-1,4-pregnadiene-21-acetate,
11β,21-dihydroxy-3-keto-1,4,17(20)-pregnatriene-21-acetate, 11α-hydroxy-3,20-diketo-1,4-pregnadiene,
11β,21-dihydroxy-3,20-diketo-1,4,16-pregnatriene-21-acetate, and
3,20-diketo-1,4-pregnadiene.

The major reaction product in each case is a 1α,3-di-lower-alkoxy-pregna-3,5-diene 21-oic acid lower alkyl ester. In the case where the process is carried out using trimethylorthoformate in the presence of methanol, these major products are respectively 1α,3-dimethoxy-11-keto-pregna-3,5,17(20)-triene 21-oic acid methyl ester; 1α,3-dimethoxy-16α-methyl-11-keto-pregna-3,5,17(20) - triene 21-oic acid methyl ester, 1α,3-dimethoxy-16α-fluoro-11-keto-pregna-3,5,17(20)-triene 21-oic acid methyl ester, 1α,3 - dimethoxy-6-methyl-11-keto-pregna-3,5,17(20)-triene, 1α,3 - dimethoxy-6-fluoro-11-keto-21-carbomethoxy-pregna-3,5,17(20)-triene, 21-oic acid methyl ester, 1α,3-dimethoxy-7α-methyl-11-keto-pregna-3,5,17(20)-triene, 21-oic acid methyl ester, 1α,3-dimethoxy-16β-methyl-11-keto-pregna-3,5,17(20)-triene, 21-oic acid methyl ester, 1α,3-dimethoxy-16-methylene - 11 - keto-pregna-3,5,17(20)-triene, 21-oic acid methyl ester, 1α,3-dimethoxy-16α-methyl-pregna-3,5,17(20)-triene 21-oic acid methyl ester, 1α,3-dimethoxy-6-methyl-pregna-3,5,17(20)-triene 21-oic acid methyl ester, 1α,3-dimethoxy-11β,17α-21-trihydroxy-20 - keto-16α-methyl-3,5-pregnadiene-21-acetate, 1α,3-dimethoxy - 11β,21 - dihydroxy-3,5,17(20)-pregnatriene-21-acetate, 1α,3-dimethoxy-11α-hydroxy-20-keto-3,5-pregnadiene, 1α,3 - dimethoxy-11β,21-dihydroxy-20-keto-3,5,16-pregnatriene-21-acetate and 1α,3-dimethoxy-20-keto-3,5-pregnadiene.

The minor reaction product in each of these instances is the Δ$^{1,3,5}$-3-methyl enol ether corresponding respectively to each of the starting materials.

In carrying out the invention it is preferable to use an alkanol which corresponds to the alkoxy group of the orthoformate. Thus, using triethylorthoformate one would preferably use ethanol, and in using trimethylorthoformate one would preferably use methanol. It is further preferred to use an excess of orthoformate over that theoretically indicated for the reaction. The use of other materials as reaction media such as ethyl acetate, benzene, methylene dichloride, chloroform, carbon tetrachloride, dialkyl ether or tetrahydrofuran is feasible but not advantageous over the use of alkanol.

As catalysts, strong acid such as hydrogen chloride gas, sulfuric acid, trichloroacetic acid, p-toluenesulfonic acid, the complex of hydrogen chloride and dimethylformamide, and the complex of borontrifluoride and diethyl ether can be used. The invention also includes the use of materials which act as a source of a strong acid; as for example, titanium tetrachloride which acts as a source of hydrogen chloride. The reaction will proceed over a wide range of temperatures from −30° to 150° C. Temperatures in the range of 40–60° C. are preferred.

The reaction mixture produced by the process of this invention can be used directly in further oxidative or reductive reactions, because each constituent compound possesses a protective structure for the 3-keto group. For example, a mixture of II and III can be reacted with either perchloryl fluoride or fluoroxytrifluoromethane to produce 6β-fluoro-3,11-diketo-1,4,17(20)-pregnatrien-21-oic acid methyl ester as the major product. The reaction of II and III with bromotrichloromethane [refer to U.S. Patent 3,047,566] led to the formation of 6-dichloromethylene-3,11-keto-1,4,17(20)-pregnatrien-21-oic acid methyl ester. Further, the major reaction product as typified by II can be separated from the minor product as typified by III by such means as chromatographic separation and the separated reaction products used, per se. In the following specific examples the starting material, i.e., 3,11-diketo-1,4,17(20)-pregnatriene-21-oic acid - methyl ester, (I) will be referred to as "Δ$^1$ Favorskii ester" for the sake of brevity and the corresponding 21-hydroxyl compound, i.e., 3-keto - 11β,21 - dihydroxy-1,4,17(20)-pregnatriene, will be referred to as "trienediol." The 1,2-dihydro compound of I, i.e., 3,11-diketo-4,17(20)-pregnadiene 21-oic acid-methyl ester, is referred to as "Favorskii ester."

EXAMPLE 1

*Preparation of the 1α-methoxy-3-methyl enol ether of Δ$^1$ Favorskii ester (1α,3-dimethoxy-11-keto-pregna-3,5,17(20)-triene 21-oic acid methyl ester)*

To a stirred slurry of 3.54 g. of Δ$^1$ Favorskii ester in 220 ml. of absolute methanol and 12.0 ml. of trimethylorthoformate is added 0.03 ml. of TiCl$_4$. The reaction mixture is stirred under a nitrogen blanket at 50–55° for 90 minutes. The reaction is quenched by the addition of 0.2 ml. of triethylamine and then it is concentrated by distillation in vacuo at 40° to afford a high boiling residue.

Pure enol ether is isolated by column chromatography of this residue on silica gel using 50% ethyl acetate-skellysolve B as the eluant. Crystallization from methanol gives pure 1α-methoxy-3-methyl enol ether of Favorskii ester, M.P. 161–166°, $[\alpha]_D -8°(CHCl_3)$, $\lambda_{max.}^{EtOH}$ 236 m$\mu$ ($\epsilon$=25,900)

*Analysis.*—Calcd. for $C_{24}H_{32}O_5$ (percent): C, 71.97; H, 8.05. Found (percent): C, 71.92; H, 8.05.

The NMR spectrum of the crude enol ether reaction product above is very similar to that of the pure sample.

EXAMPLE 2

*Preparation of trienediol*

The above high boiling residue in 50 ml. of dry benzene is added dropwise with stirring under a dry nitrogen blanket to a solution of 8.5 ml. of diisobutylaluminum hydride in 20 ml. of dry tetrahydrofuran. The temperature is maintained at 20–22° during the 5 minute addition period. Then the reaction mixture is stirred at 23–25° for 1 hour. At this point 3 ml. of ethyl acetate is added dropwise at about 25°. After 5 minutes stirring, 25 ml. of isopropyl alcohol is added dropwise at 18–22°. Again the reaction mixture is allowed to stir 5 minutes, after which, 15 ml. of glacial acetic acid is added. The temperature rose to 58° during the acid addition and is then maintained at about 60° while 40 ml. of water is added over a 15 minute period. The mixture is stirred at 55–60° until the hydrolysis of the 3-methyl enol ether protecting group is complete as shown by thin layer chromatography. The reaction mixture is allowed to cool to 30° and is added to 200 ml. of water. The crude 1α-methoxy-dienediol is extracted with several portions of methylene chloride and the combined extracts are concentrated in vacuo by distillation to produce a high boiling residue. If desired, the 1α-methoxy-dienediol can be isolated in pure form by column chromatography on silica gel using a methanol-chloroform eluant system.

In this example, however, the crude 1α-methoxy-dienediol is taken up in 100 ml. of methanol and to this is added a solution of 1.5 g. of potassium carbonate in 10 ml. of water. After 5 minutes of heating at reflux complete elimination of the 1α-methoxyl group is shown by thin layer chromatography. Then 30 ml. of water is added and the reaction mixture is allowed to stand in the refrigerator (−10°) overnight. Filtration and drying of the solids at 53° in vacuo affords 1.93 g. (59%) of trienediol, M.P. 179–181°.

EXAMPLE 3

*Preparation of 6α and 6β-fluoro-Δ$^1$-Favorskii ester*

A 1.50 g. sample of Δ$^1$-Favorskii ester is converted to the crude 1α-methoxy-3-methyl enol ether of Δ$^1$-Favorskii ester using the procedure given in Example 1. The crude enol ether is dissolved in 60 ml. of DMF and 2 ml. of H$_2$O. The solution is cooled to −15° and perchloryl fluoride is passed in at a slow rate with stirring for 15 minutes. The reaction mixture is added to 150 ml. of benzene and this is washed thoroughly with H$_2$O. The benzene solution is concentrated to a high boiling residue and this is placed on a 300 g. column of silica gel. The column is developed with 50% ethyl acetate-skellysolve B. Fractions rich in the major product from the reaction are combined and crystallization from aqueous methanol affords 140 mg., M.P. 208–217°. The NMR spectrum indicates that this material is 6β-fluoro-Δ¹-Favorskii ester. A second crop of solids, 120 mg., M.P. 223–227° with dec., is obtained from the mother liquor of the above solids combined with several less pure column fractions. The NMR spectrum of these solids indicates that it is a mixture of 6α and 6β-fluoro-Δ¹-Favorskii ester in a 1:1 ratio.

EXAMPLE 4

*Preparation of 1α-methoxy-Favorskii ester*

To a stirred slurry of 3.54 g. of Δ¹-Favorskii ester in 200 ml. of absolute methanol and 12 ml. of trimethylorthoformate is added 50 mg. of DMF·HCl complex (prepared by adding 1 mole of HCl gas to 1 mole of DMF). The reaction mixture is stirred for 1⅓ hours at 55° and then is quenched by the addition of 4 drops of pyridine. About 25 ml. of water is added followed by 0.50 ml. of 6 N hydrochloric acid. After stirring for 45 minutes at 50° the reaction mixture is added to 200 ml. of benzene. The organic layer is washed thoroughly with water and then is concentrated by distillation in vacuo. The high boiling residue is crystallized from 75 ml. of 1:1 ethyl acetate-skellysolve B to afford 1.69 g. (44%), M.P. 169–171°. An analytical sample of the 1α-methoxy-Favorskii ester product (i.e., 1α - methoxy - 3,11 - diketo pregn-4,17 (20)-diene 21-oic acid methyl ester) is obtained by recrystallization from ethyl acetate, M.P. 174.5–176.0

$[\alpha]+223°$ (c. 1.05, CHCl$_3$), $\lambda_{max.}^{EtOH}$ 234 m$\mu$ ($\epsilon=23,800$)

The NMR spectrum is consistent with the assigned structure.

This product can be converted to the 3-ethylene ketal by known methods, the resulting ketal reacted with a peroxidizing agent to produce the 5α,6α-peroxide, converted to the 6β-fluoro-5α-hydroxy compound and then reacted with acid to remove the ketal, to remove the 5α-OH group, to epimerize the 6β-fluoro group to the 6α-fluoro group and to restore the original A-ring structure. Analogous procedures for these conversions can be found in U.S. Patent 2,841,600. The products 6β and/or 6α-fluoro-Δ¹-Favorskii ester, can be converted to 6α-fluoro-prednisolone following the procedure of Examples 1 and 2, above, and substituting the resulting 6α-fluoro-trienediol for trienediol in the process of U.S. Patent 2,862,010.

Thus, the following is a preparation of the 3-ethylene ketal of 1α-methoxy-Favorskii ester.

A 500 mg. sample of 1α-methoxy-Favorskii ester in 20 ml. of benzene and 2.0 ml. of ethylene glycol is treated with a catalytic amount of p-toluenesulfonic acid monohydrate. The reaction mixture is stirred at reflux under nitrogen until the reaction is complete. After allowing the reaction mixture to cool to room temperature, the benzene solution is washed first with 10 ml. of a 5% sodium bicarbonate solution and then with several portions of water. The organic layer is concentrated and the 3-ethylene ketal of 1α-methoxy-Favorskii ester product is isolated from column fractions from an elution chromatography on the crude product mixture.

I claim:

1. A process which comprises reacting a 3-keto-Δ$^{1,4,17(20)}$-pregnatriene with a triloweralkylorthoformate in the presence of an alkanol and a strong acid to form a reaction mixture comprising 1α-alkoxy-Δ$^{3,5(6),17(20)}$-3-alkyl pregnatrienol ethers.

2. The method of claim 1 in which the starting material is a 3,11-diketo-1,4,17(20)-pregnatriene 21-oic acid lower alkyl ester.

3. The method of claim 1 in which the starting material is 3,11-diketo-1,4,17(20)-pregnatriene 21-oic acid-methyl ester, and the reaction product comprises 1α,3-dimethoxy-11-keto pregna-3,5-dien 21-oic acid lower alkyl ester.

4. 1α,3-di-lower-alkoxy pregna-3,5-diene 21-oic acid lower alkyl ester.

5. 1α,3-dimethoxy-11-oxo-pregna-3,5,17(20 - trien 21-oic acid methyl ester.

6. 1α-methoxy-2,11-dioxo-pregna-4,17(20) - diene 21-oic acid methyl ester.

References Cited

UNITED STATES PATENTS 3,305,546  2/1967  Pike _____ 260—239.55

ELBERT L. ROBERTS, Primary Examiner

U.S. Cl. X.R.

260—397.4, 397.45, 397.5

UNITED STATES PATENT OFFICE
CERTIFICATE OF CORRECTION

Patent No. 3,629,299              Dated December 21, 1971

Inventor(s) Joel E. Huber

It is certified that error appears in the above-identified patent and that said Letters Patent are hereby corrected as shown below:

Column 1, line 50, should appear as shown below instead of as in the patent:

-- 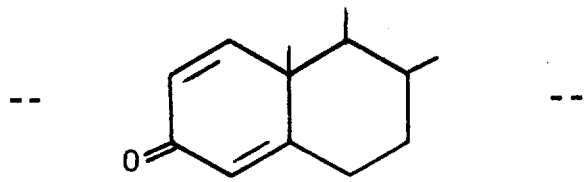 --

Column 3, line 15, for "11-keto-21-carbomethoxy-pregna" read --11-keto-pregna--. Column 6, line 31, for "pregna-3,5-dien 21-oic acid lower alkyl" read --pregna-3,5,17(20)-triene 21-oic acid methyl ester--.

Signed and sealed this 18th day of July 1972.

(SEAL)
Attest:

EDWARD M. FLETCHER, JR.          ROBERT GOTTSCHALK
Attesting Officer                Commissioner of Patents